United States Patent
Etchegoyen et al.

(10) Patent No.: US 9,314,971 B2
(45) Date of Patent: Apr. 19, 2016

(54) METHOD AND DEVICE FOR FORMING A DEPOSIT OF ONE OR MORE FRAGILE MATERIALS ON A SUBSTRATE BY SPRAYING A POWDER

(71) Applicant: CENTRE DE TRANSFERT DE TECHNOLOGIES CERAMIQUES (C.T.T.C.), Limoges (FR)

(72) Inventors: Gregory Etchegoyen, Ambazac (FR); Olivier Durand, Panazol (FR); Fabrice Rossignol, Verneiul sur Vienne (FR)

(73) Assignee: CENTRE DE TRANSFERT DE TECHNOLOGIES CERAMIQUES (C.T.T.C.), Limoges (FR)

( * ) Notice: Subject to any disclaimer, the term of this patent is extended or adjusted under 35 U.S.C. 154(b) by 147 days.

(21) Appl. No.: 14/355,565

(22) PCT Filed: Nov. 23, 2012

(86) PCT No.: PCT/EP2012/073456
§ 371 (c)(1),
(2) Date: Apr. 30, 2014

(87) PCT Pub. No.: WO2013/076239
PCT Pub. Date: May 30, 2013

(65) Prior Publication Data
US 2014/0291885 A1  Oct. 2, 2014

(30) Foreign Application Priority Data

Nov. 25, 2011  (FR) ...................................... 11 60790

(51) Int. Cl.
C23C 24/04 (2006.01)
B28B 1/00 (2006.01)
B29C 67/00 (2006.01)

(52) U.S. Cl.
CPC ............. *B29C 67/0074* (2013.01); *B28B 1/001* (2013.01); *B29C 67/0088* (2013.01); *C23C 24/04* (2013.01)

(58) Field of Classification Search
None
See application file for complete search history.

(56) References Cited

U.S. PATENT DOCUMENTS

2004/0197493 A1  10/2004 Renn et al.
2005/0147343 A1*  7/2005 Nakada ................... C23C 24/04
                                                      385/14

(Continued)

FOREIGN PATENT DOCUMENTS

EP  1510598 A1  3/2005
EP  1757370 A2  2/2007

OTHER PUBLICATIONS

Akedo, J., "Study on rapid micro-structuring using jet molding—Present status and structuring properties toward HARMST," *Microsystem Technologies*, 6, 2000, pp. 205-209.

(Continued)

*Primary Examiner* — Mary F Theisen
(74) *Attorney, Agent, or Firm* — Blakely Sokoloff Taylor & Zafman LLP (57) ABSTRACT

The invention relates to a method for forming a deposit of a fragile material on a substrate (3) by spraying a powder (1) of said material, said method including the following steps: producing an aerosol containing said powder (1) in a so-called aerosol chamber (10); accelerating the aerosol through a nozzle (31) in a so-called deposition chamber (30) having a negative pressure relative to the aerosol chamber (10); and spraying the aerosol onto the substrate (3), wherein the grains constituting the powder (1) fragment and form said deposit upon impact with the substrate (3), said method being characterized in that the formation of the deposit is controlled on the basis of a three-dimensional digital model of said deposit. The invention also relates to a device for implementing said method.

18 Claims, 4 Drawing Sheets

(56) References Cited

U.S. PATENT DOCUMENTS

| | | | |
|---|---|---|---|
| 2005/0211162 A1 | 9/2005 | Osawa | |
| 2006/0201419 A1* | 9/2006 | Akedo | C23C 24/04 118/308 |
| 2007/0160872 A1* | 7/2007 | Iwata | B01J 3/08 428/698 |
| 2008/0274333 A1* | 11/2008 | Iwasawa | C23C 16/4404 428/141 |
| 2010/0148389 A1 | 6/2010 | Akedo et al. | |
| 2011/0070359 A1* | 3/2011 | Takahashi | C23C 24/04 427/8 |
| 2013/0280414 A1* | 10/2013 | Fuchita | B05B 7/1404 427/58 |
| 2013/0295272 A1* | 11/2013 | Park | B05D 1/12 427/2.1 |

OTHER PUBLICATIONS

Ogawa, H., "Molecular Dynamics Simulation on the Single Particle Impacts in the Aerosol Deposition Process," *Materials Transactions*, vol. 46, No. 6, 2005, pp. 1235-1239.

Akedo, J., "Aerosol Deposition (AD) Integration Techniques and Their Application to Microdevices," *Ceramic Integration and Joining Technologies: From Macro to Nanoscale*, Ed. Singh, M., et al., Sep. 2011, pp. 489-520, ISBN: 978-1-1180-5676-9.

Chun, D.M., et al., "Deposition mechanism of dry sprayed ceramic particles at room temperature using a nano-particle deposition system," *Acta Materialia*, 59, 2011, pp. 2693-2703.

Akedo, J. "Room Temperature Impact Consolidation (RTIC) of Fine Ceramic Powder by Aerosol Deposition Method and Applications to Microdevices," *Journal of Thermal Spray Technology*, vol. 17, No. 2, Jun. 2008, pp. 181-198.

Boch, P., *Mécanique et Ingénierie des Matériaux: Propriétés et Applications des Céramiques*, Hermes Science Publications, 2001, pp. 19-26. ISBN 2-7462-0192-5.

Jaworek, A., et al., "Trajectories of Charged Aerosol Particles Near a Spherical Collector," *Journal of Electrostatics*, vol. 51-52, 2001, pp. 603-609.

\* cited by examiner

FIG. 1

- - Prior Art - -

METHOD AND DEVICE FOR FORMING A DEPOSIT OF ONE OR MORE FRAGILE MATERIALS ON A SUBSTRATE BY SPRAYING A POWDER

FIELD OF THE INVENTION

The present invention relates to a method and to a device for forming a deposit of a powder of a fragile material on a substrate.

BACKGROUND OF THE INVENTION

The so-called ADM (acronym of <<Aerosol Deposition Method>>) technique has several advantages in forming deposits of ceramics or other fragile materials.

The article of Jun Akedo, <<Room Temperature Impact Consolidation of Fine Ceramic Powder by Aerosol Deposition Method and Applications to Microdevices>>, Journal of Thermal Spray Technology, Vol. 17(2), June 2008, pp. 181-198, describes this method and the contemplated applications.

Figure 1:
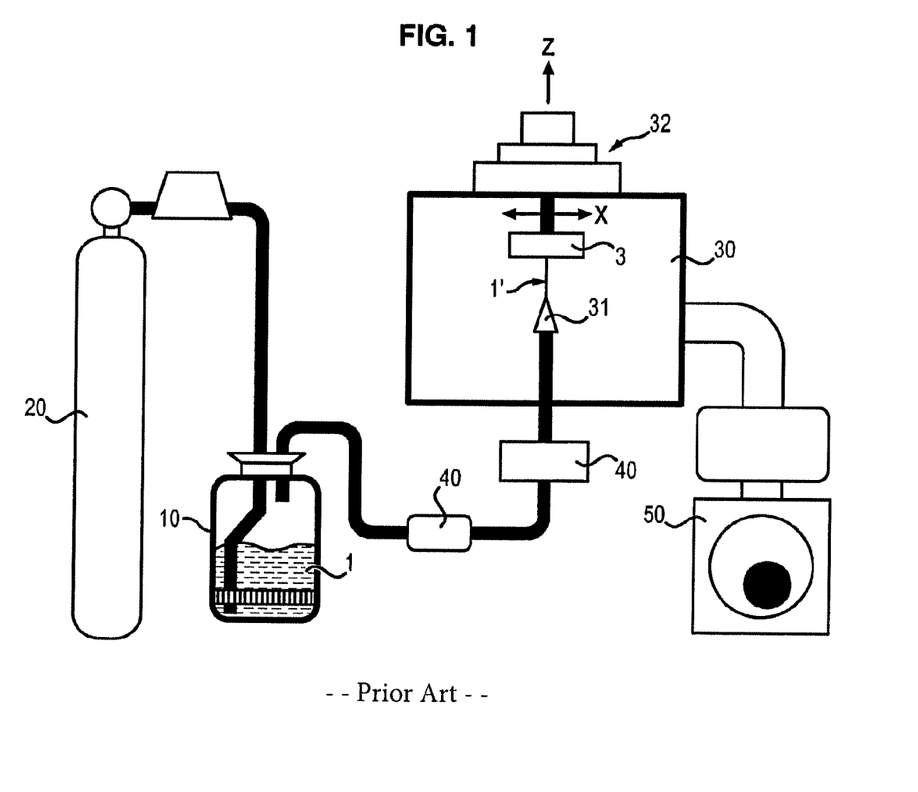
FIG. 1 is an overall diagram of a known device for forming a deposit with an aerosol.

FIG. 1 illustrates a known device allowing application of this technique.

The device comprises an aerosol chamber 10 which contains a ceramic powder 1.

The aerosol chamber 10 is connected to a gas supply device 20 which allows injection of said gas into the chamber 10 in order to mix it with the ceramic powder 1.

Moreover, a vibratory device (not shown) is configured so as to cause vibration of the chamber 10 containing the mixture of gas and of ceramic powder suitable for generating an aerosol.

Said aerosol is then injected into a deposition chamber 30 via a nozzle 31.

Optionally, one or more filters 40 may be placed on the path of the aerosol between the chamber 10 where it is generated and the deposition chamber 30, so as to retain or select the grains having the desired grain size.

Inside the deposition chamber 30, a substrate 3 is laid out onto which the ceramic powder has to be deposited.

The substrate 3 is maintained by a support 32 which is translationally moveable in the chamber, thereby allowing displacement of the substrate 3 relatively to the nozzle 31.

During the injection of the aerosol, vacuum is applied in the deposition chamber 30 by means of a pumping system 50.

The ceramic powder grains contained in the aerosol are accelerated through the nozzle 31 and cross the space separating the outlet of the nozzle 31 from the substrate 3 with high kinetic energy (the flow of the aerosol is illustrated by the mark 1').

Upon entering into contact with the substrate 3, the powder grains fragment and locally form a cohesive deposit.

This cohesion is directly induced by the energy released upon the impact without it being necessary to then proceed with sintering.

Thus, by displacing the substrate 3 relatively to the nozzle 31, it is possible to form a ceramic deposit at the surface of the substrate 3 without any heat treatment being required.

This method has multiple advantages.

On the one hand, the obtained fragile material deposit has sufficient mechanical cohesion so as not to require sintering, as opposed to known methods for example applying ceramic powders which require sintering at a high temperature for giving the deposit the required mechanical properties (hardness, cohesion).

As the method is applied at room temperature, the deposition of a fragile material may be carried out on any type of substrate, including substrates which do not withstand a high temperature and which therefore cannot be used in methods involving high temperature sintering.

The applications of this method are therefore very numerous.

Known devices give the possibility of obtaining continuous deposits at the surface of the substrate, i.e. a deposit for which the surface is in one piece and which most often has rectilinear edges.

Indeed, the surface of the substrate onto which the deposit is deposited is generally planar, and the devices generally provide a relative displacement of the substrate relatively to the nozzle along one or two orthogonal axes in a plane perpendicular to the direction of the aerosol flow 1'.

Reference may for example be made to document U.S. Pat. No. 6,531,187.

In particular, the deposition is accomplished by sweeping with the nozzle the surface of the substrate, the nozzle travelling along successive parallel lines until coverage of the desired surface.

This deposition method is for example described in document US 2011/0070359.

Document US 2006/0222862, as for it, contemplates the making of a deposit at the surface of a raised and recessed object, the nozzle then being placed at the end of an arm controlled by a computer which allows the surface of the object to be followed while maintaining the nozzle at a constant distance from the surface.

This is also a deposition carried out continuously over the surface of the object.

However, the problem is posed of depositing a discontinuous deposit at the surface of the substrate, i.e. a deposit distributed according to a predefined pattern (for example, a spiral) and/or consisting of several distinct patterns (for example, several discs) on the surface of the substrate.

Placing a mask for which the apertures define the desired pattern between the nozzle and the substrate is known, notably by the article mentioned above and by document U.S. Pat. No. 7,479,464.

However, the use of such a mask is delicate since, on the one hand, the edges of the apertures of said mask may divert the flow of the aerosol, which may lead to erosion of the substrate rather than to the formation of the deposit.

This imposes a very fine adjustment of the parameters of the flow of the aerosol, notably the negative pressure in the deposition chamber, the angle of incidence of the flow of the aerosol.

On the other hand, the known masks do not give the possibility of producing deposits according to more complex patterns, such as a spiral for example.

Moreover, if it is desired to form a pattern for which the dimensions in a plane parallel to the surface of the substrate vary according to the thickness (for example, a pattern, for which the section in a plane perpendicular to the surface of the substrate is trapezoidal or triangular), it is necessary to successively use several masks, the apertures of which are increasingly narrower.

Taking into account the fineness of the obtained deposits, the handling of these different masks would be particularly complicated for obtaining the desired section.

In any case, this masking technique seems to be particularly difficult to apply on a substrate for which the surface is not planar.

An object of the invention is therefore to provide a method for depositing a powder of a fragile material on a substrate which allows formation of a deposit consisting of one or more predefined patterns, without resorting to a mask, which would impose additional costs and manufacturing delays.

Another object of the invention is to propose a method for depositing a powder of a fragile material on a substrate which allows formation of a deposit, the dimensions of which vary over the thickness of the deposit, without resorting to several successive masks, for which the manufacturing costs are high and the lifetimes are short.

In other words, an object of the invention is to provide more flexibility as regards the geometry of the deposit than present methods using masks.

SHORT DESCRIPTION OF THE INVENTION

According to the invention, a method is proposed for forming a deposit of a fragile material on a substrate by spraying a powder of said material, said method comprising the following steps:
  generating an aerosol containing said powder in a so-called aerosol chamber,
  accelerating the aerosol through a nozzle, into a so-called deposition chamber having negative pressure relatively to the aerosol chamber,
  spraying the aerosol onto the substrate, wherein the grains forming the powder fragment and form said deposit upon impact on the substrate,
said method being characterized in that the formation of the deposit is controlled on the basis of a three-dimensional digital model of said deposit to be formed. By this control, it is possible to build any form of deposit, regardless of the change of its thickness.

By << deposit>> is meant in the context of the present invention, a material entity resulting from fragmentation and from cohesion of the powder sprayed onto the substrate. The deposit may thus consist in a continuous thin layer, or in discrete patterns at the surface of the substrate.

By <<three-dimensional digital model>> of an object is meant a three-dimensional representation of the object in a form suitable for its use with a digital processor such as a computer, for example in order to manufacture the object with computeraided manufacturing equipment (CAM). Typically, this three-dimensional digital model may be generated, before applying the manufacturing process, by means of a computeraided design (CAD) software package.

By <<fragile material>>, is meant in the present text a material characterized by brittle fracture, i.e. without any preliminary plastic deformation, during an elastic load, and as soon as the stress locally attains the critical threshold for interatomic decohesion. In this respect, reference may be made to the textbook of P. Boch, "Propriétés et applications des céramiques", (Properties and applications of ceramics), "Mécanique et Ingénierie des Matériaux" collection, Hermés Science Publications", 2001, ISBN 2-7462-0192-5.

Ceramic powders notably lend themselves well to this method.

For example and in a nonlimiting way, the method may be applied with a powder comprising a fragile material selected from aluminum oxide, zirconium oxide, silicon oxide, titanium oxide, magnesium oxide, zinc oxide, iron oxide, rare earth oxides, beryllium oxide, vanadium oxide, niobium oxide, tellurium oxide, tungsten oxide, calcium oxide, copper oxide, hafnium oxide, calcium, copper and titanium mixed oxide, tin and indium mixed oxide, aluminum and magnesium mixed oxide, barium titanate, calcium titanate, strontium titanate, silicon carbide, titanium carbide, tungsten carbide, boron carbide, silicon and titanium mixed carbide, aluminum and titanium mixed carbide, aluminum nitride, silicon nitride, titanium nitride, boron nitride, aluminum and titanium mixed nitride, aluminum and silicon oxynitrides, (either doped or not), hydroxyapatite, tricalcium phosphate, magnesium carbonate, calcium carbonate, barium carbonate, magnesium silicate, aluminosilicates.

More advantageously, the formation of said deposits comprises the following steps:
  from a three-dimensional digital model of the deposit, breaking down said digital model into a plurality of elementary layers to be successively deposited;
  calculating a plurality of relative trajectories of the nozzle and the substrate allowing reproducing each of the elementary layers to be deposited;
  successive covering of the elementary layers in order to obtain the desired deposit thickness.

The thickness of said elementary layers to be deposited may be defined in particular according to the dimensions of the impact of the aerosol flow on the substrate, to the growth rate of the thickness of the deposit and to the relative displacement velocity of the nozzle relatively to the substrate on the calculated trajectory for depositing said elementary layer.

More advantageously, the aerosol is continuously generated during the formation of the deposit.

However, it is possible to temporarily prevent the aerosol flow from hitting the substrate.

Thus, according to an embodiment of the invention, the deposit consists of several distinct patterns and during the trajectory connecting two consecutive patterns, the aerosol is diverted out of the deposition chamber.

According to another embodiment, the deposit is formed with several distinct patterns and, during the trajectory connecting two consecutive patterns, the aerosol is sprayed on a screen dynamically interposed between the nozzle and the substrate.

By <<dynamically interposed>> is meant here that the screen is moveable with the nozzle.

According to another embodiment of the invention, the deposit is formed with several distinct patterns and, during the trajectory connecting two consecutive patterns, the relative displacement of the nozzle and of the substrate is accelerated.

In a particular embodiment of the invention, the elementary layers of the deposit are successively made with one or several nozzles positioned beside each other.

It is also possible to alternatively or simultaneously spray on one or several substrates, one or several aerosols of several different powders.

The diameter of the grains of the powder is typically comprised between 0.5 and 30 μm.

Another object of the invention relates to a device for forming a deposit of a fragile material on a substrate by spraying a powder of said material, comprising a device for spraying an aerosol containing said powder onto said substrate, said spraying device comprising a device for generating said aerosol and a deposition chamber comprising a support for a substrate and a nozzle for spraying said aerosol onto the substrate, said device being characterized in that it comprises a control device comprising:

- displacement means firmly attached to the nozzle and/or to the support of the substrate, suitable for generating displacements of the nozzle and/or of the support independently along three orthogonal directions (X, Y, Z) and two axes of rotation (θ, ϵ);
- a suitable processing unit for controlling said displacement means, on the basis of a three-dimensional digital model of the deposit to be formed.

Preferably, said processing unit comprises:
- a module for computing from said three-dimensional digital model, the breakdown of the deposit to be formed into a plurality of stacked elementary layers;
- a module for determining a plurality of three-dimensional trajectories of the spray of the aerosol, for each elementary layer;
- a module for establishing a set of parameters for spraying the aerosol for each three-dimensional trajectory;
- a module for controlling said independent three-dimensional displacement means and said device for spraying the aerosol.

Moreover, said device advantageously comprises a means for temporarily preventing the aerosol flow from hitting the substrate.

Said means may comprise a suitable screen for being temporarily interposed between the nozzle and the substrate.

Alternatively, said means comprises a diversion device for diverting the aerosol flow towards an additional deposition chamber.

SHORT DESCRIPTION OF THE DRAWINGS

Other features and advantages of the invention will become apparent from the detailed description which follows, with reference to the appended drawings wherein.

DETAILED DESCRIPTION OF EMBODIMENTS OF THE INVENTION

Spraying Device

Figure 2:
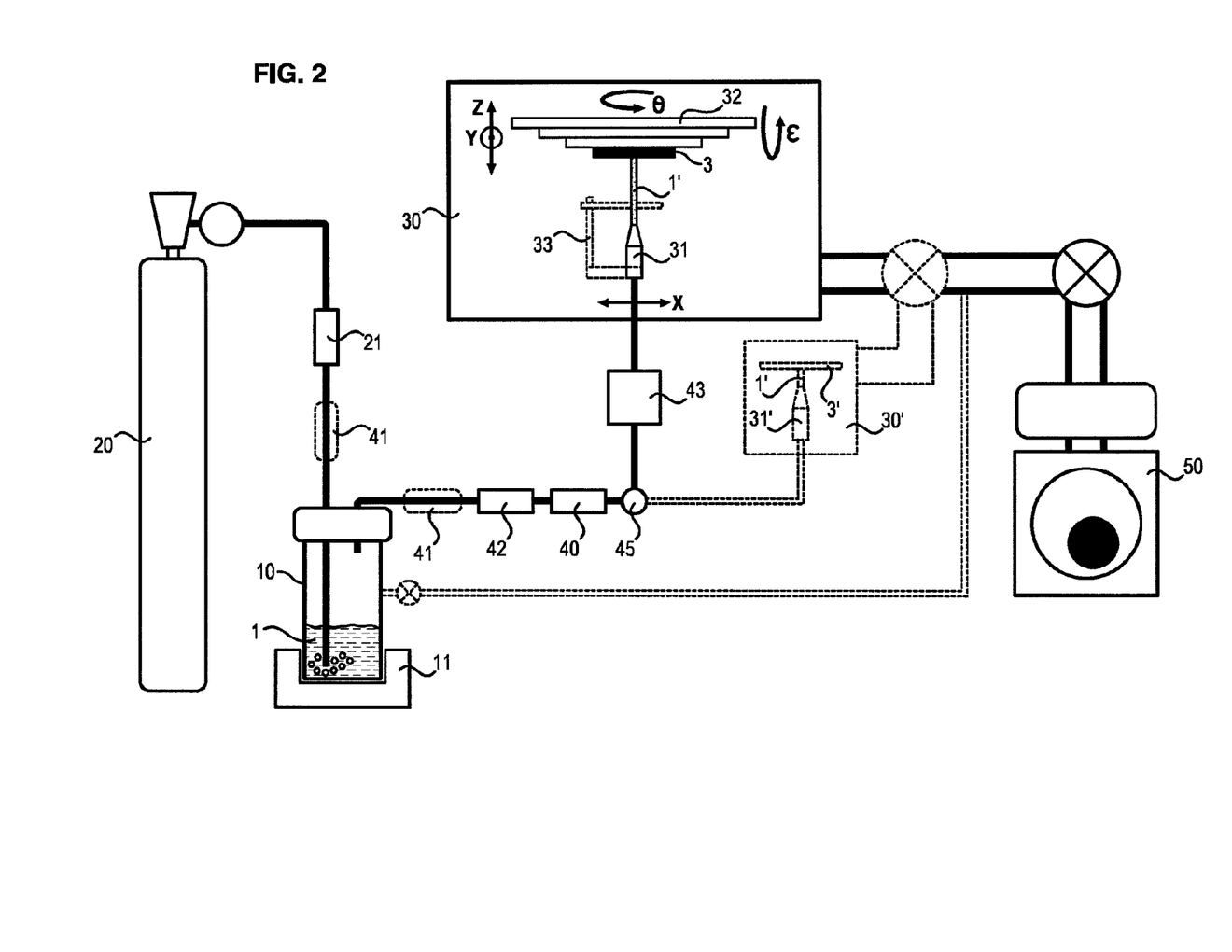
FIG. 2 is an overall diagram of an embodiment of the device according to the invention.

With reference to FIG. 2, the spraying device comprises an aerosol chamber 10 which contains a powder 1 of a fragile material and a device 20 for supplying nonreactive gas to the aerosol chamber 10.

The aerosol chamber 10 is connected to the gas supply device 20, which allows injection of said gas into the chamber 10 in order to mix it with the powder 1 of a fragile material.

The non-reactive gas is preferably selected from nitrogen, helium, argon, air and/or a mixture of at least two of these gases.

The gas supply device 20 comprises a device 21 for controlling and regulating the flow rate of the non-reactive gas with the powder 1 of a fragile material.

The flow rate values are typically comprised between 0 and 30 L/min.

Moreover, a device 11 for setting the aerosol chamber 10 into motion is configured so as to homogenize the mixture of gas and of powder of a fragile material in the aerosol chamber 10, suitably for generating an aerosol 1'.

The setting into motion of the aerosol chamber 10 is for example carried out by vibrations, rotations or centrifugation.

The spraying device further comprises a deposition chamber 30 containing the substrate 3 which should receive the deposit to be made and the nozzle 31 through which the aerosol flow is sprayed onto said substrate 3.

For this purpose, the chamber 30 comprises a support 32 for the substrate.

The substrate is maintained on the support by a gripping system allowing its total immobilization to be guaranteed during the making of the deposit and allowing its rapid withdrawal once the deposit is made.

Said gripping system for example comprises parts, wedges or magnets.

As this will be seen further down, said support 32 may be translationally and/or rotationally displaced in order to allow the formation of a deposit according to a determined pattern on the substrate.

The dry aerosol 1' produced in the aerosol chamber 10 is injected into the deposition chamber 30 via a nozzle 31 which is moveable relatively to the substrate 3, inside the deposition chamber 30.

As this will be seen further on, the nozzle 31 is preferably translationally moveable along one or two axes, the support of the substrate, as for it, being moveable translationally and/or rotationally so that it is possible to form a deposit on the substrate, regardless of its geometry and of the variation of the latter according to the thickness of the deposit.

Optionally, but advantageously, the spraying device also comprises means for treating the aerosol according to the granular selection of the dry material load and to the amount of humidity which it contains.

Thus, a drying device 41 may be placed either between the gas supply device 20 and the aerosol chamber 10, or in the aerosol chamber 10 exclusively, or between the aerosol chamber 10 and the deposition chamber 30.

Thanks to this drying device 41, the aerosol produced in the aerosol chamber 10 and circulating as far as the deposition chamber 30, is a dry aerosol 1'.

Thus the solid load of the aerosol does not agglomerate and does not clog the different members of the spraying device.

Moreover, a granular selection device 42 may be placed between the aerosol chamber 10 and the deposition chamber 30, in order to only select the grains of the powder 1 which have the required size for being sprayed onto the substrate 3.

The diameter of the grains of the powder 1 which may be sprayed onto the substrate 3, is generally comprised between 0.5 µm and 30 µm.

In addition to this granular selection device 42, one or several filters 40 may be placed between the aerosol chamber 10 and the deposition chamber 30.

These filters 40 also allow selection of the grains for which the size is comprised between 0.5 µm and 30 µm.

Moreover, a device 43 for controlling the load of the aerosol may be placed between the aerosol chamber 10 and the deposition chamber 30 in order to measure and regulate in real time the amount of powder which is sprayed onto the substrate 3.

This device 43 for example consists of a transparent tube, in which the aerosol from the aerosol chamber 10 circulates towards the deposition chamber 30, and is crossed by a laser beam which is recovered by a detector.

This device 43 allows determination of the grain size distribution of the powder grains of the dry aerosol as well as of the mass load of the aerosol, expressed in mg/cm$^3$, from the aerosol chamber 10 and moving towards the deposition chamber 30.

A pumping system 50 is connected to the deposition chamber 30 through a fluidic connection.

Said system 50 allows vacuum to be applied to the inside of the deposition chamber 30.

Said system 50 comprises a primary pump and a turbopump giving the possibility of attaining absolute pressures in the deposition chamber 30 comprised between 10 Pa and 1,000 Pa.

Moreover, said system 50 may be connected through a fluid connection to the aerosol chamber 10, thus also allowing vacuum to be applied inside the aerosol chamber 10.

Thus, it is for example possible to control and regulate the pressure difference between the aerosol chamber 10 and the deposition chamber 30.

In any case, the deposition chamber 30 has negative pressure relatively to the aerosol chamber during the formation of the deposit.

Said system 50 gives the possibility of maintaining a vacuum during the injection of the aerosol into the deposition chamber 30 through the nozzle 31.

The attained pressure in the deposition chamber 30, when the aerosol flow is injected, is preferably comprised between 10 and 1,000 Pa.

The device for forming a deposit of a powder of a fragile material, which has just been described, is moreover adaptable in order to form multi-nozzles and/or multi-material deposits on a same substrate or on different substrates positioned on the same support 32.

Thus, according to a non-illustrated embodiment, several aerosol chambers may be positioned in parallel, so as to feed several nozzles, each of the nozzles giving the possibility of spraying an aerosol flow of a powder of a fragile material.

A configuration example (non-illustrated) is the spraying of the same powder of a fragile material through several nozzles fed with several aerosols from several aerosol chambers containing the same powder.

Another configuration example (non-illustrated) is the spraying of several different powders of several fragile materials through several nozzles fed with several aerosols from several aerosol chambers each containing a different powder.

Device for Controlling the Formation of the Deposit

In order to spray the aerosol on a substrate—either planar or non-planar—via a spraying nozzle according to a determined pattern, the device further comprises means for three-dimensional displacements of the nozzle and/or of the support of the substrate, independent along three reference directions and two independent axes of rotation.

Figure 3:
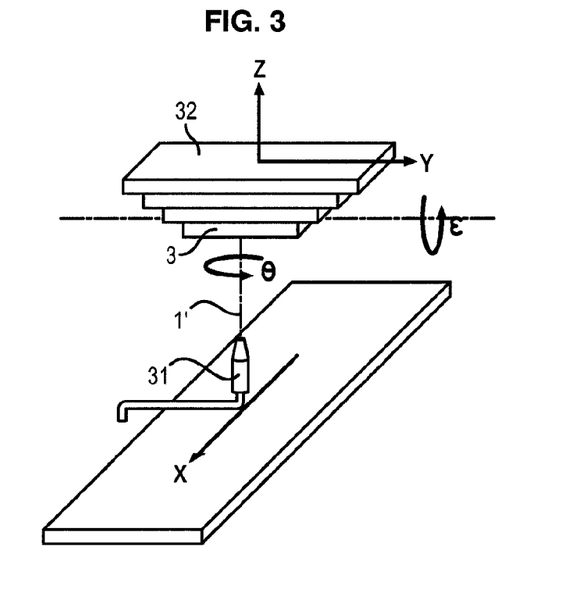
FIG. 3 is a diagram giving details on the displacement axes of the support of the substrate and of the nozzle.

As illustrated in FIG. 3, an orthogonal reference system X, Y, Z in which the axes X and Y are perpendicular in the horizontal plane and the axis Z is in the vertical plane (generally corresponding to the orientation of the nozzle).

Two angles of rotation are also defined: the angle θ corresponding to a rotation around the vertical axis Z and the angle ε corresponding to a rotation around the horizontal axis Y.

Suitable displacement means give the possibility of independently generating displacements of the nozzle and of the support of the substrate.

Advantageously, but not as a limitation, the nozzle 31 is firmly attached to a motor driven displacement means allowing translation of the nozzle along the X axis.

Moreover, the support 32 of the substrate is firmly attached to two motor-driven means allowing translation along the axis Y and translation along the axis Z respectively and to two motor-driven means for rotation according to e and E.

The control device preferably also comprises an information processing unit giving the possibility of servo-controlling the displacement of the nozzle 31 relatively to the surface of the substrate or conversely, of the surface of the substrate relatively to the nozzle 31, so that even when the substrate is not planar, the aerosol flow is always perpendicular to the surface of the substrate at the impact point and at a constant distance therefrom.

By maintaining this perpendicularity of the incidence of the aerosol, it is possible to ensure the quality of the deposit, notably as regards the accuracy of the pattern and the cohesion of the grains.

Depending on the pattern of the deposit to be formed on the substrate, it is thus possible to combine the movements of the nozzle and of the support of the substrate in order to give the adequate trajectory to the aerosol flow.

It is not always necessary to carry out displacements along all the possible degrees of freedom; indeed, in order to form a deposit according to a simple pattern (for example a rectilinear strip), only a few of the different possible displacements may prove to be sufficient.

Thus, and in a non-limiting way, mention may be made of the following examples:
- the nozzle 31 is in motion along the X axis and the support 32 bearing the substrate 3 is fixed along Y and/or along Z and/or along θ and/or along ε;
- the nozzle 31 is fixed along the X axis and the support 32 bearing the substrate 3 is in motion along Y and/or along Z and/or along θ and/or along ε;
- the nozzle 31 is in motion along the X axis and the support 32 bearing the substrate 3 is in motion along Y and/or along Z and/or along θ and/or along ε.

Of course, it would be possible to provide the nozzle with more degrees of freedom, and, as a counterpart, provide the support of the substrate with less degrees of freedom.

In the case of multi-nozzle configurations as mentioned above, said nozzles are advantageously translationally moveable along the X direction, relatively to the substrate 3, and the support 32 of the substrate 3 is translationally moveable along the directions Y, Z and/or rotationally along θ, ε relatively to the nozzles 31.

The displacement velocities of the support 32 and of the nozzle 31 are comprised between 0.010 mm/s and 100 mm/s, preferentially between 0.125 mm/s and 10 mm/s.

Moreover, the information processing unit comprised in the control device is also intended for controlling the displacement means mentioned above depending on the three dimensional geometry of the deposit to be formed on the substrate 3 and on the three dimensional geometry of the substrate 3 to be coated.

For this purpose, said processing unit comprises a module for computing, on the basis of the three-dimensional model of the deposit and of the substrate if necessary, the breakdown into a plurality of stacked elementary layers, said elementary layers being preferably of equal thickness.

The processing unit further comprises a module for determining a plurality of three-dimensional trajectories for spraying the aerosol, for each elementary layer.

By three-dimensional trajectory, is meant the relative trajectory of the nozzle 31 relatively to the substrate 3.

The processing unit also comprises a module for establishing a set of parameters for spraying the aerosol (notably including but in a non-limiting way, the gas flow rate, the nozzle-substrate distance, the displacement velocities, the outlet section of the nozzle, the grain size distribution, the load of the aerosol . . . ) for each three-dimensional trajectory.

The processing unit also comprises a module for controlling the means for independent three-dimensional displacements and the means for generating and spraying the aerosol.

Finally, the control device may comprise means for measuring the three-dimensional displacements and the spraying parameters, connected to the processing unit, and which give the possibility of checking whether the spraying trajectories and parameters are compliant with the determined trajectories and parameters.

In a particularly advantageous way, the control device is further adapted so as to temporarily interrupt the formation of the deposit on the substrate without however interrupting the generation of the aerosol.

This device for interrupting the deposition is particularly advantageous when the deposit does not form a continuous pattern, for example when it appears as plurality of surfaces distant from each other.

Indeed, the generation and the interruption of the aerosol are not instantaneous.

Temporarily stopping the generation of the aerosol during the formation of the deposit is therefore a penalty.

The control device therefore preferably comprises a means for, while continuously generating the aerosol, temporarily preventing the aerosol flow from hitting the substrate and this in a synchronized way with the means for displacements of the nozzle 31 and of the support 32 bearing the substrate 3, according to the trajectories determined by the computing module.

According to an embodiment, this means comprises a dynamic masking screen 33 (visible in FIG. 2) suitable for being temporarily placed between the nozzle 31 and the substrate 3.

This dynamic masking screen 33 for example consists of a planar object (disc, plate, blade . . . ) which may be brought, for example by means of an articulated arm, into a plane perpendicular to the aerosol flow 1' exiting the nozzle 31, between the nozzle 31 and the substrate 3.

According to an alternative (not shown), said dynamic masking screen 33 may for example be recessed in order to have orifices with particular geometries in order to only let through a portion of the aerosol flow if need be.

Said recessed dynamic masking screen then allows definition of the two-dimensional geometry of the aerosol flow sprayed onto the substrate.

Said recessed dynamic masking screen is then moveable with the nozzle.

Another means for interrupting the aerosol flow 1' on the substrate 3 for example comprises a device 45 for diverting the aerosol flow, placed between the aerosol chamber 10 and the deposition chamber 30.

Said diversion device 45 gives the possibility of diverting the aerosol flow 1' circulating between the aerosol chamber 10 and the deposition chamber 30 towards an additional deposition chamber 30'.

Such a diversion device 45 and the additional deposition chamber 30' are also illustrated in FIG. 2, but it is obvious that the screen 33 and the diversion device 45 are alternative means for temporarily interrupting the formation of the deposit and that it is therefore not necessary to combine them.

Said additional deposition chamber 30' may be connected to the pumping system 50 through a fluidic connection.

The pumping system 50 thus gives the possibility of attaining the same pressure values in the additional chamber 30' as in the deposition chamber 30.

Said additional chamber 30' contains a nozzle 31' allowing the aerosol flow 1' to be sprayed on a sacrificial substrate 3'.

The goal of this diversion of the aerosol flow is not to form a determined deposit on the sacrificial substrate 3' but to temporarily prevent the impact of powder grains on the substrate 3 in the deposition chamber 30.

The placement and withdrawal of the screen 33 or the application and stopping of the diversion by the device 45 may be carried out practically instantaneously, much more rapidly than an interruption and a resumption of the generation of the aerosol.

Alternatively, the means for displacement of the nozzle and/or of the support of the substrate may be accelerated, so that the deposit formed on the substrate on the covered surface during this acceleration is negligible relatively to the intentionally formed deposit.

Method for Forming the Deposit

The formation of the deposit at the surface of a substrate comprises the following steps.

One starts with a three-dimensional digital model of the deposit D positioned on the substrate, the latter may be planar or non-planar.

The achievement of this model may be applied by any computeraided design software package, in a format which is compatible with the processing unit.

The geometrical volume of the deposit is cut into a plurality of elementary layers of equal thicknesses.

The thickness of the elementary layers is itself computed from the amount of material deposited in a single passage on the whole of the surface to be coated.

Figure 4:
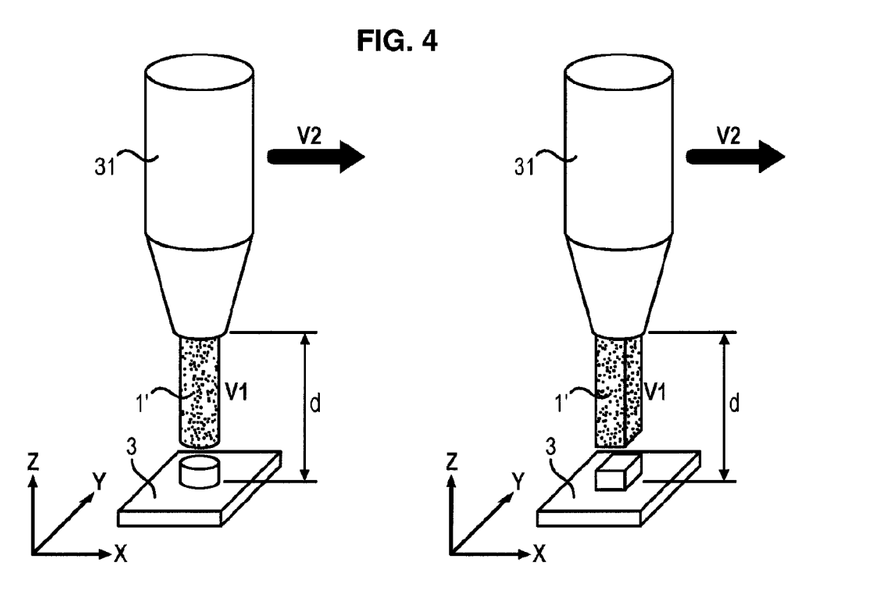
FIG. 4 is a diagram illustrating the parameters required for calculating the thickness of the successive layers to be stacked in order to manufacture the deposit.

With reference to FIG. 4, said amount of material is computed:

from the dimensions in the plane (X, Y) of the impact of the aerosol beam on the substrate 3 (the latter may be circular, like on the left figure, or rectangular, like on the right figure, depending on the geometry of the nozzle).

from the growth rate in thickness (noted as V1) of the deposit along the Z axis, from the displacement velocity of the aerosol flow (noted as V2) in a direction parallel to the substrate, said displacement velocity corresponding to the relative velocity of the nozzle relatively to the substrate.

The relative trajectories of the nozzle 31 and of the substrate 3 are then computed in order to build each elementary layer of the deposit properly positioned on the substrate.

The trajectories may be continuous, allowing the building of a continuous pattern, like for example a segment.

The trajectories may also be discontinuous, allowing the building of a discontinuous pattern, like for example dotted lines.

If necessary, said computed trajectories are synchronized with temporary stopping of the aerosol flow, by computing instants for activating or deactivating the means (for example the screen 33 or the diversion device 45) giving the possibility of temporarily interrupting the spraying of the aerosol flow onto the substrate 3.

Next, the data of the trajectories and of the velocities V1, V2 are then transmitted by the processing unit to a Computer-Aided Manufacturing (CAM) machine.

The spraying device is started, in order to generate the aerosol flow through the nozzle 31 and the CAM machine, in order to set the displacement means into motion for physically reproducing the trajectories with the velocities V1, V2 and a fixed nozzle/substrate distance (d).

EXAMPLES OF APPLICATION OF THE INVENTION

Example 1

Figure 5:
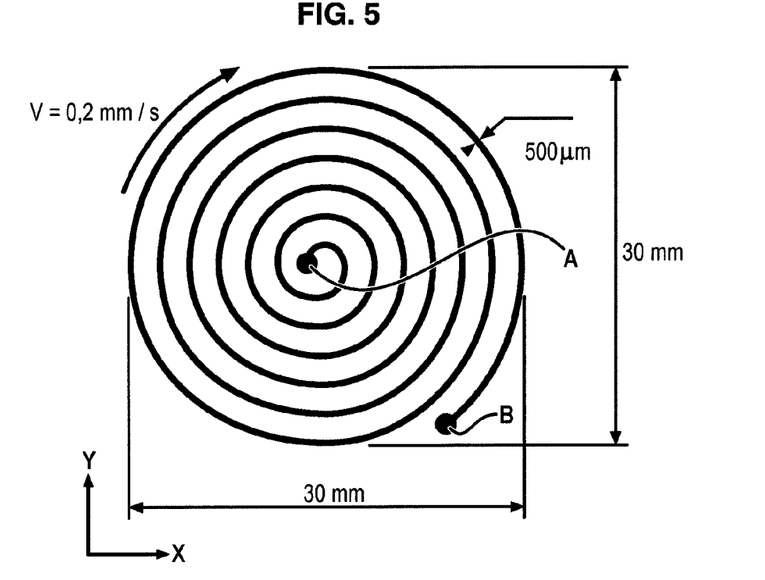
FIG. 5 is a diagram giving details on the example of a spiral deposit in the X, Y plane with a small thickness along the Z axis.

In this example illustrated in FIG. 5, the substrate 3 is planar.

The manufactured deposit is a spiral pattern characterized by a width of 500 µm, maximum dimensions along the X and Y axes of 30 mm and a thickness of 1 µm.

The impact diameter of the aerosol is 200 µm.

The displacement velocity V of the nozzle 31 relatively to the support 32 bearing the substrate 3 is 0.2 mm/s.

The thickness of the elementary layer is equal to 1 µm.

The thickness growth rate of the elementary layer is 6 µm/min.

The spiral pattern is manufactured continuously, i.e. without interrupting the aerosol flow 1'.

The spiral pattern is manufactured from a single trajectory connecting the point A and the point B, controlled by the control device.

The trajectory of the aerosol flow 1' sprayed by the nozzle 31 is reproduced by the motor-driven axes of the spraying device.

The motor-driven axes of the spraying device allow combined movements along the axes X and/or Y and/or Z and/or A and/or s, in order to reproduce the spiral pattern.

In order to obtain a thickness of 1 µm with the spraying parameters above, the trajectory is reproduced 10 times, alternatively from the point A to the point B and from the point B to the point A.

Example 2

Figure 6:
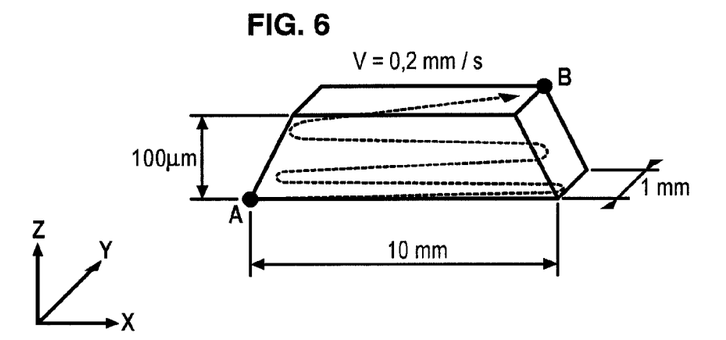
FIG. 6 is a diagram giving details of the example of a parallelipipedal deposit along X, Y, Z, with a rectangular geometry in the X, Y plane, a trapezoidal geometry in the X, Z and Y, Z plane.

With reference to FIG. 6, the manufactured deposit is a pattern, the section of which in the plane (X, Z), is trapezoidal on a planar substrate in the plane (X, Y), the pattern being characterized by maximum dimensions along the axes X and Y of 10 mm and 1 mm respectively, and a thickness along the Z axis of 100 µm.

The impact diameter of the aerosol flow is 200 µm.

The displacement velocity V of the nozzle 31 relatively to the support 32 bearing the substrate 3, is 0.2 mm/s.

The thickness growth rate of the layer is 10 µm/min.

The trapezoidal section pattern is manufactured continuously, i.e. without interrupting the aerosol flow 1', from a single trajectory (in dotted lines) connecting the point A and the point B.

The trajectory of the aerosol flow sprayed by the nozzle 31 is reproduced by the motor driven axes of the spraying device.

The motor-driven axes of the spraying device allow combined movements along the axes X and/or Y and/or Z and/or θ and/or ε, in order to reproduce the trapezoidal pattern.

In this example, the dimensions along X, Y of the deposit decrease when the Z thickness increases and said deposit may be obtained without using a set of masks with decreasing dimensions when the thickness increases.

Example 3

Figure 7:
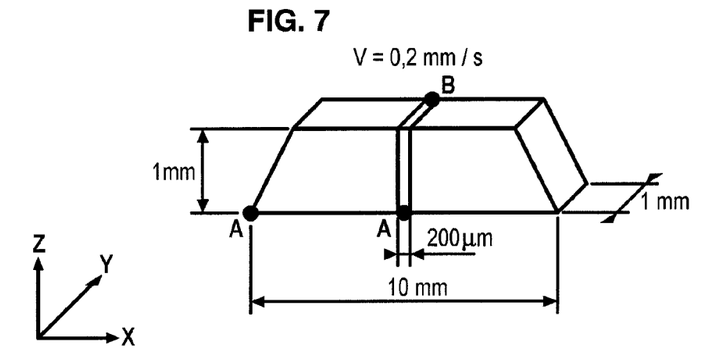
FIG. 7 is a diagram giving details on the example of a rectilinear deposit with a small width on a non-planar substrate.

With reference to FIG. 7, the substrate is not planar but has a parallelipepidal shape with a rectangular section in the plane (X, Y) and a trapezoidal section in the planes (X, Z) and (Y, Z).

The maximum dimensions of the substrate are: along the X axis: 10 mm, along the Y axis: 1 mm and along the Z axis: 1 mm, respectively.

The manufactured deposit is a strip with a width of 200 µm and a thickness of 1 µm formed on two adjacent faces of the substrate.

The impact diameter of the aerosol flow is 200 µm.

The displacement velocity V of the nozzle 31, relatively to the support 32, bearing the substrate 3 is 0.2 mm/s.

The thickness growth rate is 6 µm/min.

Further, the deposit is characterized by the fact that the trajectory allowing it to be manufactured is characterized by ascending a step.

The strip pattern is continuously manufactured, i.e. without interrupting the aerosol flow 1', from a single trajectory connecting the point A and the point B.

The trajectory of the aerosol flow 1' sprayed by the nozzle 31 is reproduced by the motor-driven axes of the spraying device.

The motor-driven axes of the spraying device allow combined movements along the axes X and/or Y and/or Z and/or θ and/or ε, in order to reproduce the trapezoidal pattern.

In this example, the distance between the nozzle 31 and the substrate 3 is maintained constant by servo-controlling the substrate 3 along Z in order to manufacture a material strip on a non-planar substrate 3.

If it was desired to deposit several parallel strips on the substrate, it would be appropriate, after having deposited the first strip, to temporarily interrupt the formation of the deposit, for example by diverting the aerosol flow or by interposing a screen between the nozzle and the substrate, while the nozzle is moved at right angles to the second strip, and then to resume the formation of the deposit once the nozzle is properly positioned for following the second trajectory.

One alternative would be, without interrupting the spraying of the aerosol onto the substrate, of substantially accelerating the relative velocity of the nozzle relatively to the substrate between the location of the first strip and that of the second strip.

Of course, the examples mentioned in the present text, are given purely as illustration and the invention is not limited to these particular embodiments.

REFERENCES

Jun Akedo, <<Room Temperature Impact Consolidation of Fine Ceramic Powder by Aerosol Deposition Method and Applications to Microdevices>>, Journal of Thermal Spray Technology, Vol. 17(2), June 2008, pp. 181-198, P. Boch, "Proprietes et applications des céramiques", "Mécanique et Ingénierie des Matériaux" collection, Hermés Science Publications, 2001, ISBN 2-7462-0192-5.

U.S. Pat. No. 6,531,187.

US 2011/0070359.

US 2006/0222862

U.S. Pat. No. 7,479,464

The invention claimed is:

1. A method for forming a deposit of a fragile material on a substrate by spraying a powder of said material, said method comprising the following steps:
generating an aerosol containing said powder in an aerosol chamber,
accelerating the aerosol through a nozzle, in a deposition chamber having negative pressure relatively to the aerosol chamber,
spraying the aerosol on the substrate, wherein the grains forming the powder fragment and form said deposit upon impact upon the substrate,
wherein the formation of the deposit is controlled on the basis of a three-dimensional digital model of said deposit to be formed.

2. The method of claim 1, wherein the formation of said deposit comprises the following steps:

from a three-dimensional digital model of the deposit, breaking down said digital model into a plurality of elementary layers to be deposited successively;

computing a plurality of trajectories of the nozzle and of the substrate allowing reproducing each of the elementary layers to be deposited;

successively covering the elementary layers in order to obtain the desired deposit thickness.

3. The method of claim 2, wherein the thickness of said elementary layers to be deposited is in particular defined depending on the impact dimensions of the aerosol flow on the substrate, the growth rate of the thickness of the deposit and the relative displacement velocity of the nozzle relatively to the substrate on the computed trajectory for depositing said elementary layer.

4. The method of claim 1, wherein the aerosol is continuously generated during the formation of a deposit.

5. The method of claim 4, wherein the aerosol flow is temporarily prevented from hitting the substrate.

6. The method of claim 1, wherein the deposit consists of several distinct patterns and in that, during the trajectory connecting two consecutive patterns, the aerosol is diverted out of the deposition chamber.

7. The method claim 1, wherein the deposit is formed with several distinct patterns and, during the trajectory connecting two consecutive patterns, the aerosol is sprayed onto a screen dynamically interposed between the nozzle and the substrate.

8. The method of claim 1, wherein the deposit is formed with several distinct patterns and, during the trajectory connecting two consecutive patterns, the relative displacement of the nozzle and the substrate is accelerated.

9. The method of claim 2, wherein the elementary layers of the deposit are successively made by one or several nozzles, positioned beside each other.

10. The method of claim 1, wherein one or several aerosols of several different powders are alternatively or simultaneously sprayed on one or several substrates.

11. The method of claim 1, wherein the diameter of the grains of the powder is comprised between 0.5 and 30 μm.

12. The method of claim 1, wherein the powder is a ceramic powder.

13. The method of claim 12, wherein the powder comprises a fragile material selected from aluminum oxide, zirconium oxide, silicon oxide, titanium oxide, magnesium oxide, zinc oxide, iron oxide, rare earth oxides, beryllium oxide, vanadium oxide, niobium oxide, tellurium oxide, tungsten oxide, calcium oxide, copper oxide, hafnium oxide, calcium, copper and titanium mixed oxide, tin and indium mixed oxide, aluminum and magnesium mixed oxide, barium titanate, calcium titanate, strontium titanate, silicon carbide, titanium carbide, tungsten carbide, boron carbide, silicon and titanium mixed carbide, aluminum and titanium mixed carbide, aluminum nitride, silicon nitride, titanium nitride, boron nitride, aluminum and titanium mixed nitride, aluminum and silicon oxynitrides, hydroxyapatite, tricalcium phosphate, magnesium carbonate, calcium carbonate, barium carbonate, magnesium silicate, aluminosilicates.

14. A device for forming a deposit of a fragile material on a substrate by spraying a powder of said material, comprising a device for spraying an aerosol containing said powder onto said substrate, said spraying device comprising a device for generating said aerosol and a deposition chamber comprising a support for the substrate and a nozzle for spraying said aerosol onto the substrate, said device comprising a control device comprising:

displacement means firmly attached to the nozzle and/or the support of the substrate, suitable for generating displacement of the nozzle and/or of the support independently along three orthogonal directions and two axes of rotation;

a processing unit suitable for, on the basis of a three-dimensional digital model of the deposit to be formed, controlling said displacement means.

15. The device of claim 14, wherein said processing unit comprises:

a module for computing, from said three-dimensional digital model, the breakdown of the deposit to be formed into a plurality of stacked elementary layers;

a module for determining a plurality of three-dimensional trajectories for spraying the aerosol, for each elementary layer;

a module for establishing a set of parameters for spraying the aerosol for each three-dimensional trajectory;

a module for controlling said independent three-dimensional displacement means and said device for spraying the aerosol.

16. The device of claim 14, further comprising means for temporarily preventing the aerosol flow from hitting the substrate.

17. The device of claim 16, wherein said means comprises a screen suitable for being temporarily interposed between the nozzle and the substrate.

18. The device of claim 16, wherein said means comprises a diversion device for diverting the aerosol flow towards an additional deposition chamber.

* * * * *